(12) United States Patent
Kishi et al.

(10) Patent No.: US 10,916,045 B2
(45) Date of Patent: Feb. 9, 2021

(54) DEVICE, PROGRAM, AND INFORMATION PROCESSING METHOD

(71) Applicant: DENTSU INC., Tokyo (JP)

(72) Inventors: Yuki Kishi, Tokyo (JP); Yasuo Higa, Tokyo (JP); Akio Iijima, Tokyo (JP); Tatsuki Tatara, Tokyo (JP)

(73) Assignee: DENTSU INC., Tokyo (JP)

( * ) Notice: Subject to any disclaimer, the term of this patent is extended or adjusted under 35 U.S.C. 154(b) by 15 days.

(21) Appl. No.: 16/081,222

(22) PCT Filed: Mar. 7, 2017

(86) PCT No.: PCT/JP2017/008971
§ 371 (c)(1),
(2) Date: Aug. 30, 2018

(87) PCT Pub. No.: WO2017/154894
PCT Pub. Date: Sep. 14, 2017

(65) Prior Publication Data
US 2019/0026932 A1    Jan. 24, 2019

(30) Foreign Application Priority Data
Mar. 8, 2016    (JP) ................................. 2016-044890

(51) Int. Cl.
*G06T 13/20* (2011.01)
*G06T 13/40* (2011.01)
*G06T 19/20* (2011.01)

(52) U.S. Cl.
CPC ............ *G06T 13/205* (2013.01); *G06T 13/20* (2013.01); *G06T 13/40* (2013.01); *G06T 19/20* (2013.01)

(58) Field of Classification Search
CPC ........ G06T 13/40; G06T 13/20; G06T 13/205; G06T 19/20
See application file for complete search history.

(56) References Cited

U.S. PATENT DOCUMENTS

| 5,909,218 A * | 6/1999 | Naka ........................ G06T 13/40 345/418 |
| 2003/0194608 A1* | 10/2003 | Hirai ........................ H01M 2/32 429/178 |

(Continued)

FOREIGN PATENT DOCUMENTS

| JP | 3337938 | 8/2002 |
| JP | 3380158 | 12/2002 |
| WO | 2015/194509 | 12/2015 |

OTHER PUBLICATIONS

International Search Report issued in International Patent Application No. PCT/JP2017/008971, dated May 23, 2017, together with an English translation thereof.

*Primary Examiner* — Ming Wu
(74) *Attorney, Agent, or Firm* — Greenblum & Bernstein, P.L.C.

(57) ABSTRACT

The present invention is designed so that, even when a CG model moves with a tempo, it is possible to realize natural movement. The device according to one aspect of the present invention has a control section that exerts control so that specific data, which corresponds to a case where a predetermined parameter has a specific value, is generated using a plurality of pieces of data corresponding to respective cases where the predetermined parameter has different values, and a playback section that reproduces a predetermined computer graphics (CG) model based on the specific data.

19 Claims, 11 Drawing Sheets

(56) References Cited

U.S. PATENT DOCUMENTS

| | | | |
|---|---|---|---|
| 2004/0055444 A1* | 3/2004 | Ishii | G10H 1/0041 84/604 |
| 2004/0095352 A1* | 5/2004 | Huang | G06T 17/10 345/473 |
| 2016/0055420 A1* | 2/2016 | Karanam | G16H 50/20 700/52 |

* cited by examiner

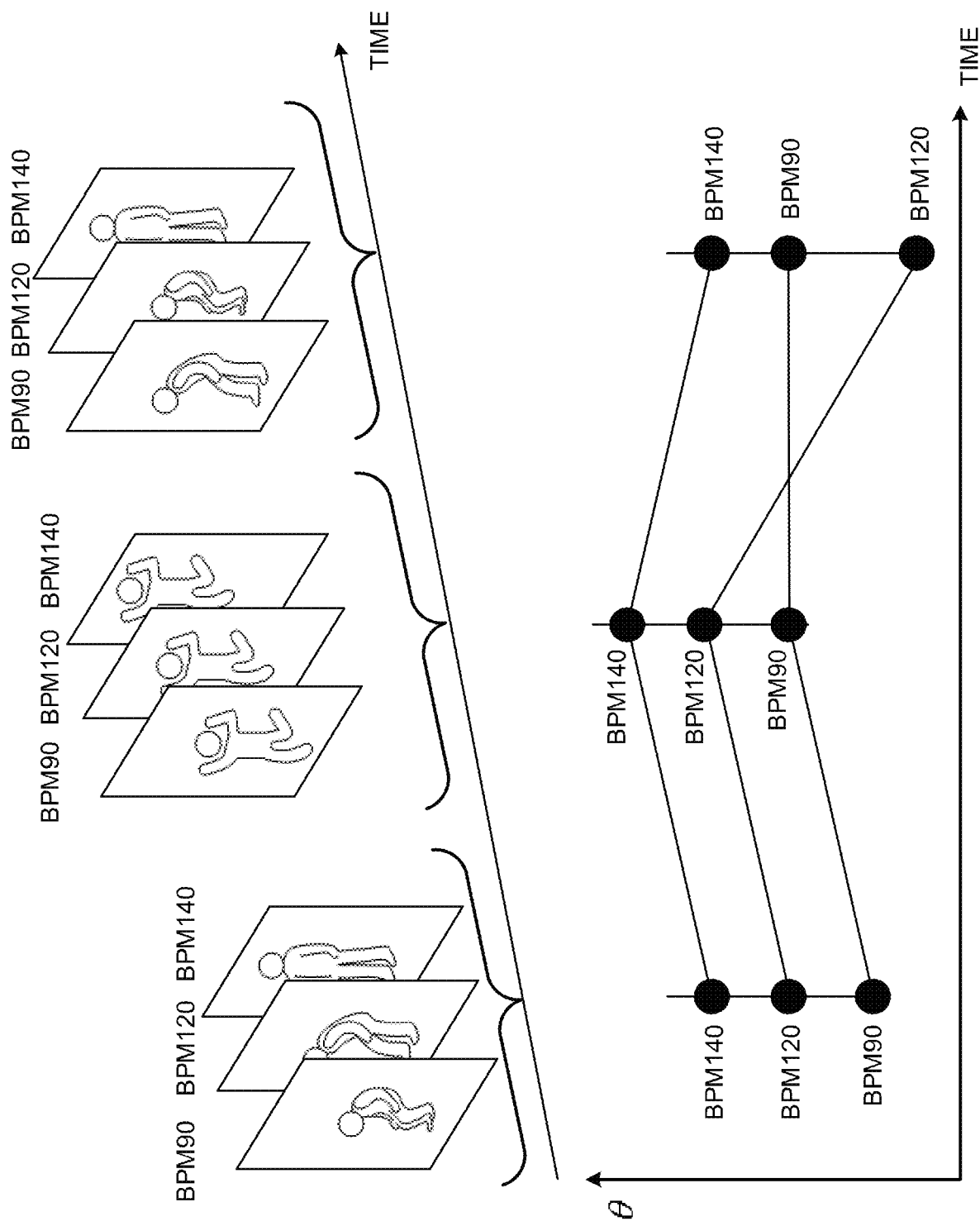

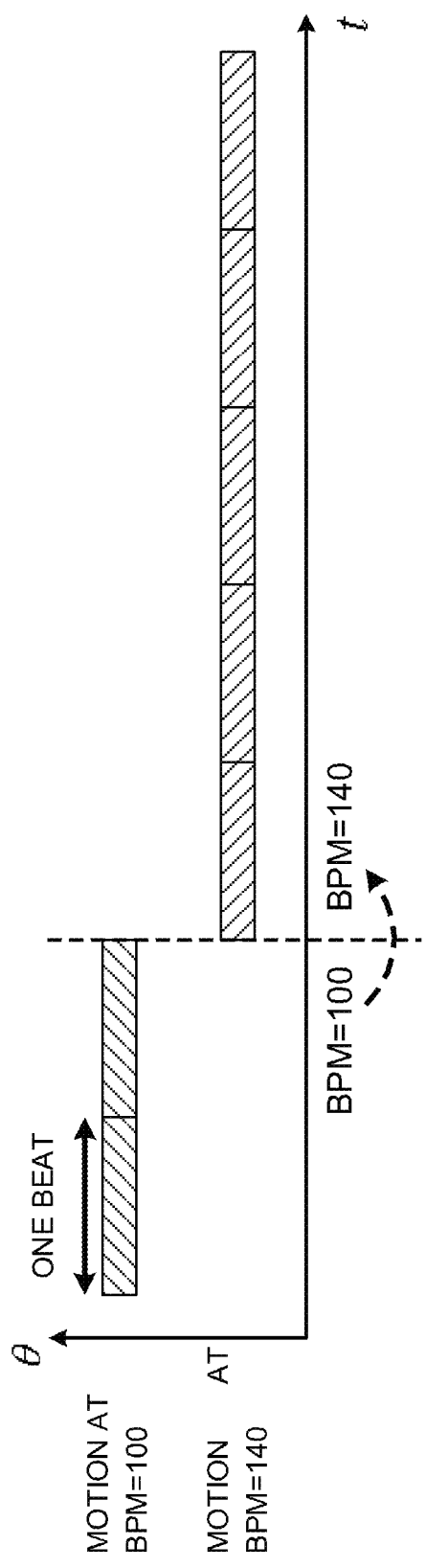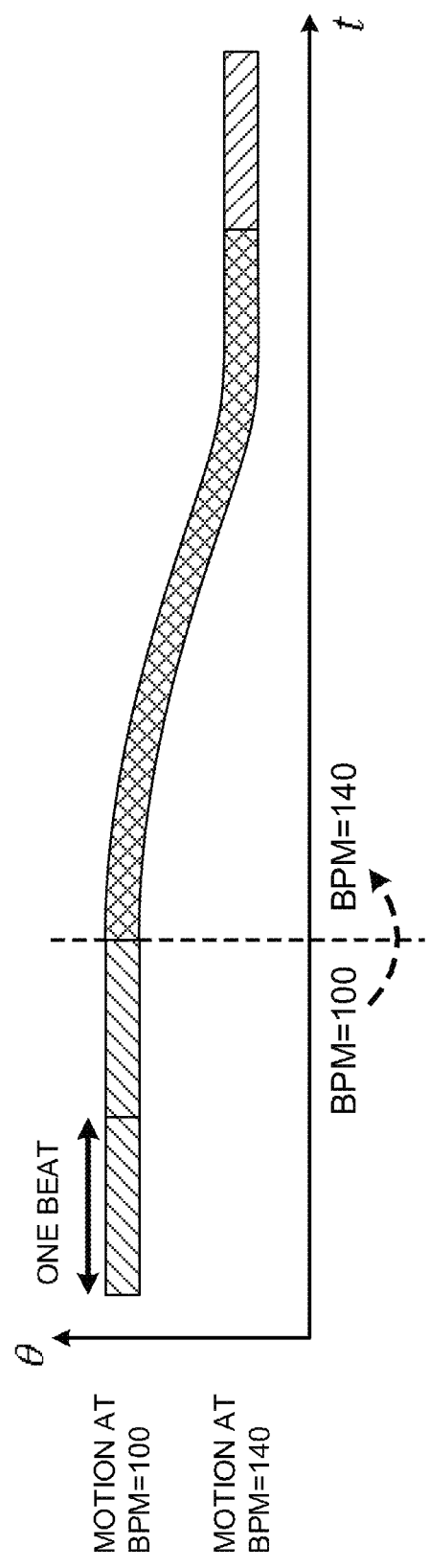

US 10,916,045 B2

DEVICE, PROGRAM, AND INFORMATION PROCESSING METHOD

TECHNICAL FIELD

The present invention relates to control of three-dimensional computer graphics.

BACKGROUND ART

In recent years, following the improvement of hardware performance, the use of three-dimensional computer graphics (also referred to as "3D CG" (Three Dimensional Computer Graphics), or referred to simply as "CG" (Computer Graphics) and/or the like) has been gaining popularity. Also, various data structures for representing characters in 3D CG (CG models) have been proposed. For example, data structures that are suitable for characters having complex skeleton structures such as human beings have been proposed (see, for example, patent literature 1 and 2). CG animation movies can be made by using such CG models and data structures.

CITATION LIST

Patent Literature

Patent Literature 1: Japanese Patent Publication No. 3337938
Patent Literature 2: Japanese Patent Publication No. 3380158

SUMMARY OF INVENTION

Technical Problem

The scenes to use CG models have grown in variety, and, following this trend, the demand for reproducing the movement (motion) of CG models in synchronization with a predetermined tempo has increased. For example, it is possible to use reproduction technology (for example, double-speed playback) that allows changes in speed. However, changing the speed at which a certain motion is played does not change the content of the motion, and this raises the problem that CG models' movement does not look natural.

The present invention has been made in view of the above, and it is therefore an object of the present invention to provide a device, a program and an information processing method that can realize natural movement even when CG models move with a tempo.

Solution to Problem

One aspect of the present invention provides a device having a control section that exerts control so that specific data, which corresponds to a case where a predetermined parameter has a specific value, is generated using a plurality of pieces of data corresponding to respective cases where the predetermined parameter has different values, and a playback section that reproduces a predetermined computer graphics (CG) model based on the specific data.

Advantageous Effects of Invention

According to the present invention, it is possible to realize natural movement even when CG models move with a tempo.

BRIEF DESCRIPTION OF DRAWINGS

FIG. 8 is a diagram to show examples of motion data and corresponding choreo data over time;
FIGS. 9A and 9B are diagrams to show examples of the herein-proposed merging method in the event BPM changes suddenly.

DESCRIPTION OF EMBODIMENTS

Figure 1A:
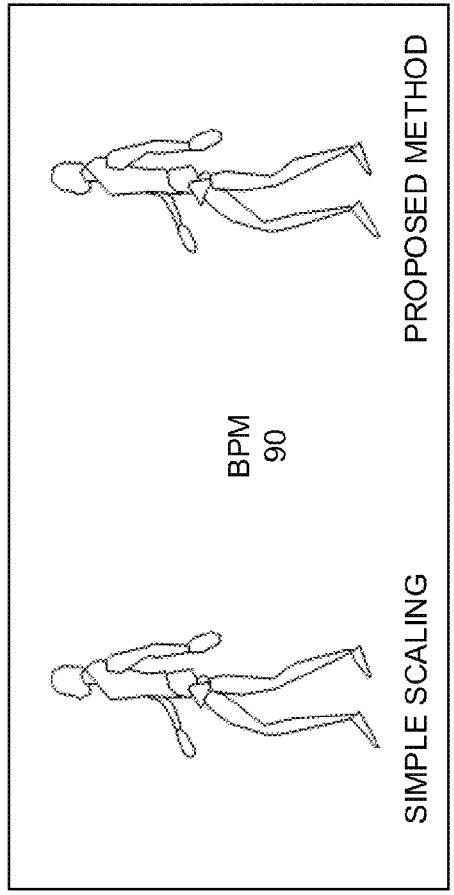
FIGS. 1A and 1B are diagrams to show examples of simple motion scaling and the merging method according to an embodiment of the present invention, in the event BPM varies.

In the past, the present inventors have come up with a new data structure that specifies the motion of CG models in chronological order, with a tempo, and invented, for example, a device that reproduces the movement of CG models following a tempo (BPM (Beats Per Minute)) (see Japanese Patent Application No. 2015-077162). According to the present invention, for example, human motion is recorded and used as motion data (data to represent the motion of CG models) with a tempo, so that it is possible to reproduce motions that perfectly fit the tempo, even when the BPM changes.

Note that the above data structure according to the present invention may be referred to as "choreography data format," "choreo data format," and so on. Also, data that is compatible with choreo data format, such as data represented in choreo data format, data conforming to choreo data format (including, for example, frame-unit time-series data that can be converted into choreo data format) and so on may be referred to as "choreo data," "dance choreo data" and/or the like.

The present inventors have focused on elements that are necessary to represent changes in motion more naturally, in studying the use of choreo data. Then, the present inventors have found out that, in general motion, the basic motion changes following a tempo.

For example, the motion of "walking," in which left and right arms and legs, opposite to each other, move alternately, may show natural changes if transitions occur such that, as the tempo (which, in this case, may be referred to as "pitch") is raised, the motion will later switch to "running" at the moment both feet leave the ground, and, as the tempo is raised further, the motion will gradually shift to a posture that leans forward.

Also, in the case of dance, if the tempo is raised, the motion of arms and legs may become smaller in order to catch up with the speed, or, conversely, the motion may become more intense (bigger).

However, according to the conventional method of changing the tempo, even when the tempo of "walking" motion data is raised, the basic motion, in which left and right arms and legs, opposite to each other, move alternately, will remain unchanged, and does not transform to "running." Consequently, there is a problem where changing the tempo using the conventional method makes the movement of CG models look unnatural.

So, the present inventors have come up with the idea of changing motion data itself in response to changes of BPM. Accordingly, for example, it is possible to realize a configuration that stores different poses (motion data) on a per BPM basis, and switches to different poses automatically in accordance with variations of BPM. Also, instead of the BPM-based automatic switching control, it is possible to exert control so that changes are made manually (arbitrarily), on a real-time basis, by, for example, moving the same motion intensely and/or quietly.

FIG. 1 is a diagram to show an example of a comparison between simple motion scaling and the merging method according to an embodiment of the present invention in the event BPM varies. Here, in simple motion scaling (simple scaling), new motions are generated by increasing and/or reducing the beats in accordance with changes in BPM, based on the walking motion at BPM=90. Meanwhile, in the merging method (hereinafter also referred to as the "herein-proposed merging method" or simply the "merging method") according to one embodiment of the present invention, for example, the walking motion at BPM=90 and the running motion at BPM=180 are used as base data (also referred to as "merge source data," "base data," etc.), and these motions are merged based on changes in BPM.

Figure 1B:
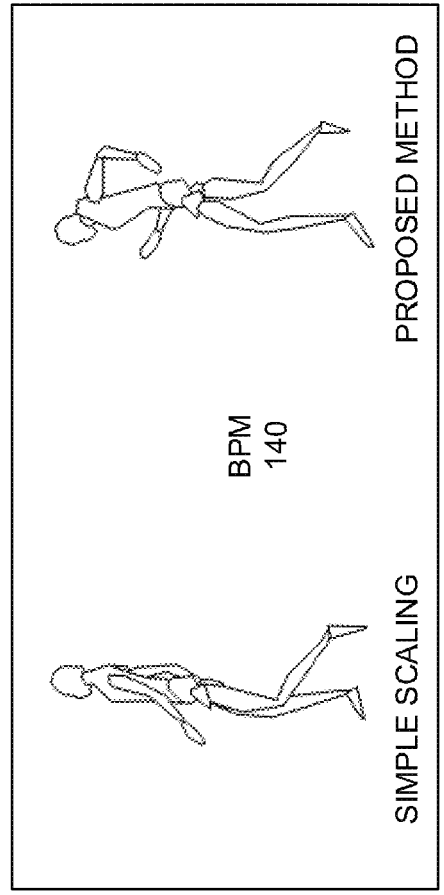

FIG. 1A shows a case of BPM=90, and both methods correspond to a walking motion at BPM=90. FIG. 1B shows a case of BPM=140. In the simple scaling of FIG. 1B, a walking motion at a fast pace is reproduced. Meanwhile, with the herein-proposed merging method of FIG. 1B, a plurality of base motions are merged, so that a motion between walking and running is reproduced.

Assuming that the BPM is increased gradually from 90 to 180, simple scaling only realizes a movement in which walking will change to fast walking, but the herein-proposed merging method can realize a movement in which walking will change to running gradually. Thus, the proposed method allows smooth transitions between different motions following changes in BPM, so that more natural motions can be suitably reproduced.

Now, embodiments of the present invention will be described below in detail with reference to the accompanying drawings.

<Information Processing System>

Figure 2:
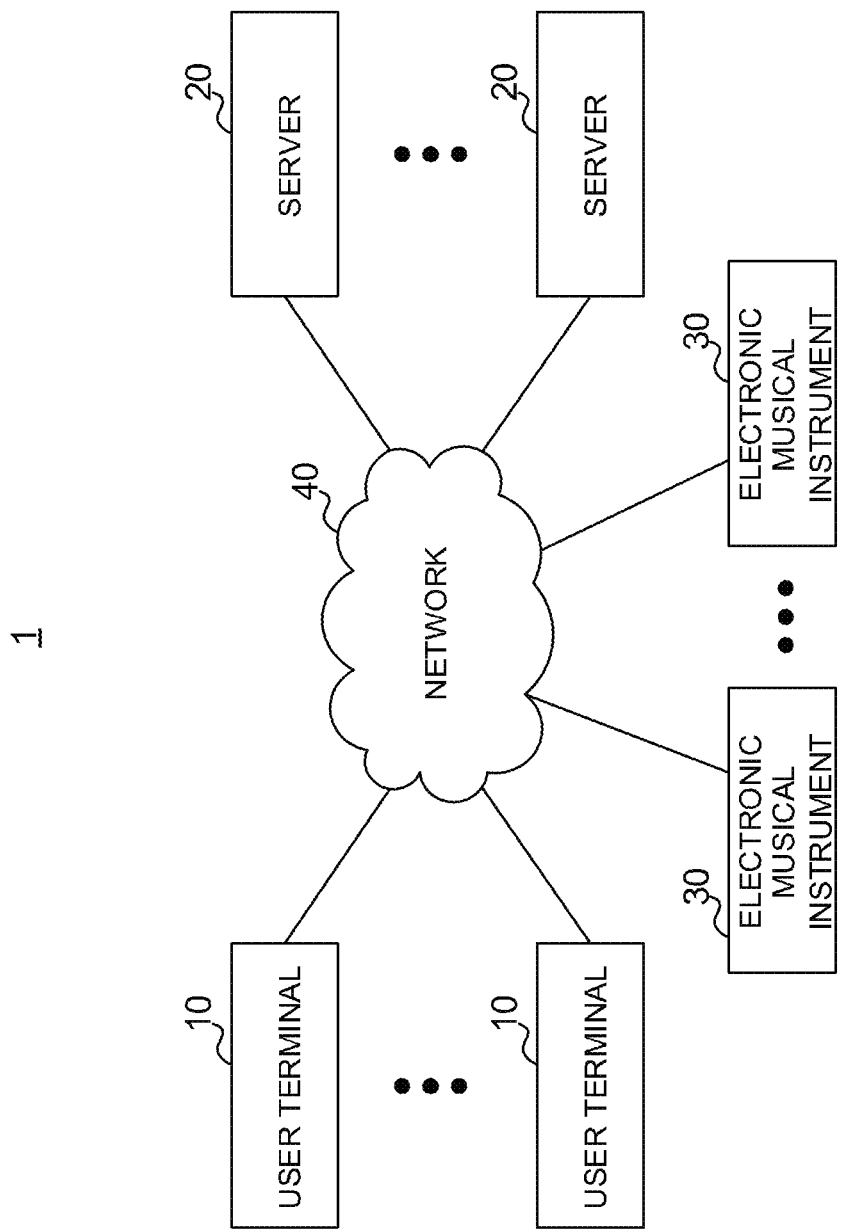
FIG. 2 is a diagram to show an example of a schematic structure of the information processing system according to an embodiment of the present invention.

First, the information processing system, to which the present invention is applied, will be described. FIG. 2 is a diagram to show an example of a schematic structure of an information processing system according to an embodiment of the present invention. The information processing system 1 shown in FIG. 2 is comprised of a user terminal 10, a server 20, an electronic musical instrument 30 and a network 40.

The user terminal 10, the server 20 and the electronic musical instrument 30 can be mutually connected via the network 40, and, by using choreo data, perform processes (transmission/reception, conversion, movie making, display, etc.) related to CG models.

The user terminal 10 may be a portable terminal (mobile communication terminal) such as a portable phone, a smart phone or a tablet-type terminal, or the user terminal 10 may be a stationary communication terminal such as a personal computer, a multi-function television or a set-top box (for example, Apple TV (registered trademark), Chromecast (registered trademark), etc.).

The server 20 is a device having functions for transmitting and/or receiving choreo data with the user terminal 10 and/or the electronic musical instrument 30. Note that this choreo data may be transmitted and received upon request from the user terminal 10 and/or the electronic musical instrument 30, or may be transmitted and received periodically or at predetermined timings. Furthermore, the server 20 may transmit/receive data (for example, movies and/or the like) that is generated using choreo data to/from the user terminal 10 and/or the electronic musical instrument 30.

The electronic musical instrument 30 is a device having functions for producing sounds to match performance information such as MIDI (Musical Instrument Digital Interface) data. For example, the electronic musical instrument 30 is an electronic piano, a synthesizer, etc., but is by no means limited to these.

The network 40 connects between devices so that information can be communicated. For example, the network 40 includes various networks such as the Internet, a mobile network, a LAN (Local Area Network), a WAN (Wide Area Network) and/or others. Note that the network 40 may be configured wirelessly or may be configured by wire.

Note that this system configuration is an example, and is by no means limited to this. For example, although FIG. 1 each show a configuration in which a plurality of user terminals 10, servers 20, and electronic musical instruments 30 are included, the number of each device is by no means limited to what is illustrated. Furthermore, the information processing system 1 may be configured not to include part of the user terminal 10, the server 20 and the electronic musical instrument 30. Also, even when the user terminal 10 and/or others are not connected to the network 40, a predetermined storage medium may be connected, and choreo data may be input/output via this storage medium.

(Structure of Equipment)

Figure 3:
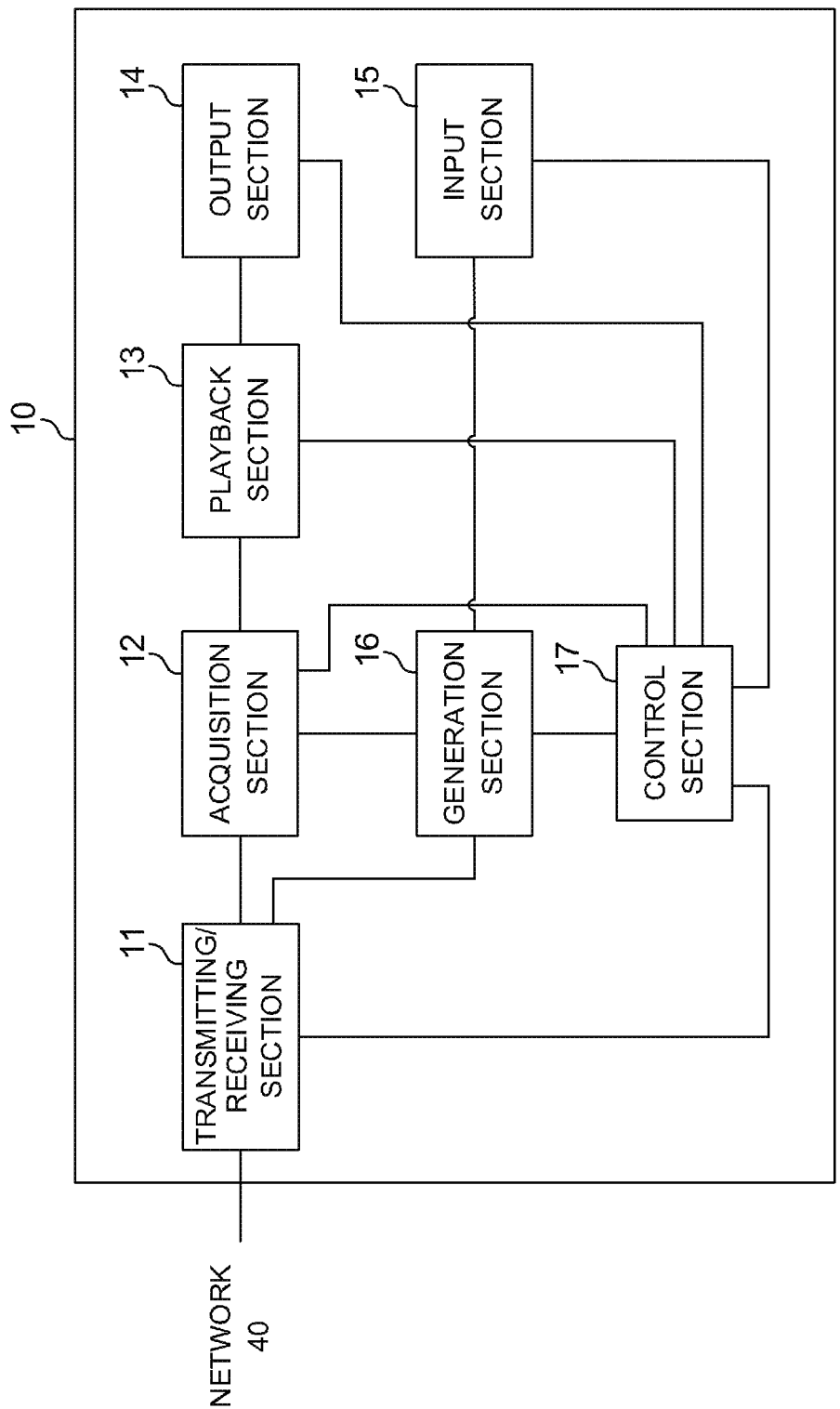
FIG. 3 is a diagram to show an example of a functional structure of a user terminal according to an embodiment of the present invention.

FIG. 3 is a diagram to show an example of a functional structure of a user terminal according to an embodiment of the present invention. As shown in FIG. 3, the user terminal 10 has a transmitting/receiving section 11, an acquisition section 12, a playback section 13, an output section 14, an input section 15, a generation section 16 and a control section 17. The user terminal 10 has the function of implementing the step of performing information processing related to CG models based on the data structure according to one embodiment of the present invention. Furthermore, the user terminal 10 can constitute a display device, a transmitting device, a receiving device, a movie generating device, a data converting device, a data generating device and so on, as the information processing device according to one embodiment of the present invention.

Note that FIG. 3 primarily shows functional blocks of characteristic parts of this embodiment, and the user terminal 10 may also have other functional blocks that are required in other processes. Also, the server 20 and the electronic musical instrument 30 may have all or part of the functional blocks shown in FIG. 3, or may constitute the information processing device according to the present invention (display device, transmitting device, receiving device, movie generating device, data converting device, data generating device, etc.), like the user terminal 10 does.

The transmitting/receiving section 11 is comprised of a communication device for allowing communication between computers via the network 40, and transmits and receives choreo data, necessary information and/or the like, to/from other user terminals 10, servers 20, and electronic musical instruments 30. The transmitting/receiving section 11 outputs the received choreo data to the acquisition section 12. In addition, the transmitting/receiving section 11 may output predetermined data (for example, a CG model's motion data) that is received, to the generation section 16. In addition, the transmitting/receiving section 11 outputs various pieces of information that are received, to the control section 17.

The transmitting/receiving section 11 can be constituted by a transmitter/receiver, a transmitting/receiving circuit or a transmitting/receiving device that can be described based on common understanding of the technical field to which the present invention pertains. Note that the transmitting/receiving section 11 may be comprised of a transmission section 111 and a receiving section 112. Also, the transmitting/receiving section 11 may be referred to as a "network device," a "network controller," a "network card," a "communication module" and/or the like.

The acquisition section 12 acquires choreo data from the transmitting/receiving section 11 and/or the generation section 16. The acquisition section 12 outputs the acquired choreo data to the transmitting/receiving section 11 and/or the playback section 13. The acquisition section 12 may select and output at least one piece of choreo data from a plurality of pieces of choreo data based on control signals received in the transmitting/receiving section 11 and commands from the control section 17.

The playback section 13 plays the data input from the acquisition section 12, and outputs this to the output section 14. For example, the playback section 13 interprets choreo data and outputs signals related to the playback of a CG movie to the output section 14. In addition, the playback section 13 may play predetermined content (for example, sound data such as music and sound/voice), and output this to the output section 14. For example, if the content is sound data, the content is converted into playback signals in a format that can be recognized in the output section 14, according to the audio file format of the content. The playback section 13 can be constituted by a player, an image/video/audio processing circuit, an image/video/audio processing device, an amplifier and so on that can be described based on common understanding of the technical field to which the present invention pertains.

The output section 14 is comprised of an output device for controlling the output to the outside, and outputs the content playback signals that are received as input from the playback section 13. The output section 14 may be comprised of a plurality of functional parts. For example, the output section 14 may be comprised of a display section that displays visual data (for example, a CG movie) and an audio output section that outputs sound data. The display section can be constituted by a display device such as a display, a monitor, etc., that can be described based on common understanding of the technical field to which the present invention pertains. The audio output section can also be constituted by an output device, such as a speaker, that can be described based on common understanding of the technical field to which the present invention pertains.

The input section 15 is comprised of an input device that accepts input from the outside, and accepts input according to operations by the user. Furthermore, the input section 15 may be connected with predetermined equipment or a storage medium, and receive data as input. The input section 15 may output the input result to the control section 17 or the generation section 16, for example. The input section 15 can be constituted by an input device such as a keyboard, a mouse and a button, an input/output terminal, an input/output circuit and so on, which can be described based on common understanding of the technical field to which the present invention pertains. Furthermore, a configuration may be employed here in which the input section 15 and the display section form one entity (for example, a touch panel).

Note that the input section 15 may obtain information about the external environment. For example, part of the input section 15 may be constituted by one of a camera that captures still images and/or moving images, a microphone that captures sound/voice, and a sensor that captures various types of information (such as a touch sensor, a ground sensor, an acceleration sensor, a tilt sensor, a gyroscope, a temperature sensor (thermography), an ultrasonic sensor, a geodetic sensor (laser scan sensor), a radio beam (radar) and so on), or a combination of these.

The generation section 16 generates choreo data by using data that is input from the transmitting/receiving section 11, the input section 15, the control section 17 and so on. The generation section 16 can merge ("synthesize," "generate," etc.) choreo data (motion data) based on the merging method according to one embodiment of the present invention.

In addition, the generation section 16 can convert choreo data into OSC format (OSC message), for communicating based on OSC (Open Sound Control) protocol. By converting MIDI messages of choreo data into OSC messages, it is possible to control motion data more flexibly, via the network 40.

The data/messages generated in the generation section 16 may be output to the transmitting/receiving section 11, the acquisition section 12, the playback section 13 and/or others. The generation section 16 can be constituted by a computer, a computing circuit, a computing device and so on that can be described based on common understanding of the technical field to which the present invention pertains.

The control section 17 controls the whole of the user terminal 10. For example, the control section 17 may control the transmitting/receiving section 11 to transmit and/or receive predetermined signals. The control section 17 may also control the acquisition/output of data in the acquisition section 12, the reproduction in the playback section 13, the output from the output section 14, the output from the input section 15, the generation/output in the generation section 16 and so on. The control section 17 may control various types of data—including the choreo data that is generated in the generation section 16—to be stored in the storage section (memory, storage, etc.) of the user terminal 10. The control section 17 can be constituted by a controller, a control circuit or a control device that can be described based on common understanding of the technical field to which the present invention pertains.

As will be described later, the control section 17 exerts control so as to generate specific data (choreo data, motion data, etc.) that corresponds to each individual case where a predetermined parameter (merging parameter) has a specific value, based on a plurality of pieces of data (for example, choreo data) that correspond to respective cases where the predetermined parameter has particular values.

Note that the block diagrams that have been used to describe the above embodiment show blocks in functional parts. These functional blocks (components) may be implemented in arbitrary combinations of hardware and/or software. Also, the means for implementing each functional block is not particularly limited. That is, each functional block may be implemented with one physically integrated device, or may be implemented by connecting two physically separate devices via radio or wire and by using these multiple devices.

For example, a user terminal and/or the like according to one embodiment of the present invention may function as a computer that executes the information processing method of the present invention. For example, at least one of the above-described user terminal 10, server 20 and electronic musical instrument 30 may be configured as a computer device that physically includes a processor, a memory, a storage, a communication device, an input device, an output device and/or others, and that performs processes related to CG models using the data structure (choreo data) according to one aspect of the present invention.

Each function of the user terminal 10, server 20 and electronic musical instrument 30 is implemented by reading predetermined software (program) on hardware such as a processor and a memory, and by allowing calculations in the processor, communication in the communication device and reading and/or writing of data in the memory and the storage.

The processor may control the whole computer by, for example, running an operating system. The processor may be configured with a central processing unit (CPU) that includes interfaces with peripheral devices, a control device, a computing device, a register and so on. For example, the control section 17 and the playback section 12 described above may be realized by the processor.

Furthermore, the processor reads programs (program codes), software modules and/or data, from the storage and/or the communication device, into the memory, and executes various processes according to these. As for the programs, programs to allow computers to execute at least part of the operations of the embodiment described hereinafter may be used. For example, the control section 17 of the user terminals 10 may be stored in the memory and implemented by a control program that operates on the processor, and other functional blocks may be implemented likewise.

The memory may be a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory may be referred to as a "register," a "cache," a "main memory (primary storage device)" and so on. The memory can store executable programs (program codes), software modules and so on for implementing the radio communication method according to one embodiment of the present invention.

The storage is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage may be referred to as a "secondary storage device."

The communication device is, for example, the transmitting/receiving section 11 described above. The input device is, for example, the input section 15 described above. The output device is, for example, the output section 14 described above. Also, the processor, the memory and/or other devices are connected with buses for communicating information. The buses may be formed with a single bus, or may be formed with buses that vary between devices.

Also, the user terminal 10, server 20 and electronic musical instrument 30 may be structured to include hardware such as a microprocessor, a digital signal processor (DSP), an ASIC (Application-Specific Integrated Circuit), a PLD (Programmable Logic Device), an FPGA (Field Programmable Gate Array) and so on, so that part or all of the functional blocks may be implemented by the hardware. For example, the processor may be implemented with at least one of these pieces of hardware.

According to one aspect of the present invention, each device (user terminal 10, server 20 and electronic musical instrument 30) described above uses choreo data. In the following description, choreo data format will be outlined first, and then the method of merging motion data according to one embodiment of the present invention will be described.

<Choreo Data Format>

The choreo data format according to one aspect of the present invention is a data format that includes time-series information for specifying the coordinates of a CG model's components in chronological order, in units of beats. Note that "units of beats" refer to units that can be specified based on "beats," and include not only one-beat units, but also fractional beat units such as sets of ⅛ beats, multiple-beat units such as sets of two beats and/or others.

Before specific formats will be described in detail, the method of representing CG models will be described first. In the present specification, example cases will be described, in which a skeleton model having a skeleton structure (articulated structure) is used as a CG model, but the CG model to which the present invention can be applied is by no means limited to this.

Figure 4B:
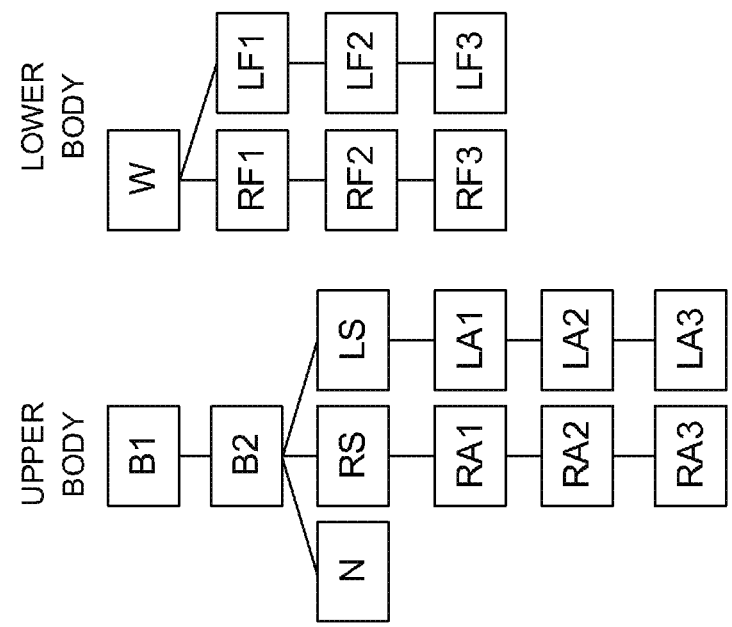
FIGS. 4A and 4B are diagrams to show examples of skeleton models having a skeleton structure (articulated structure)
Figure 4A:
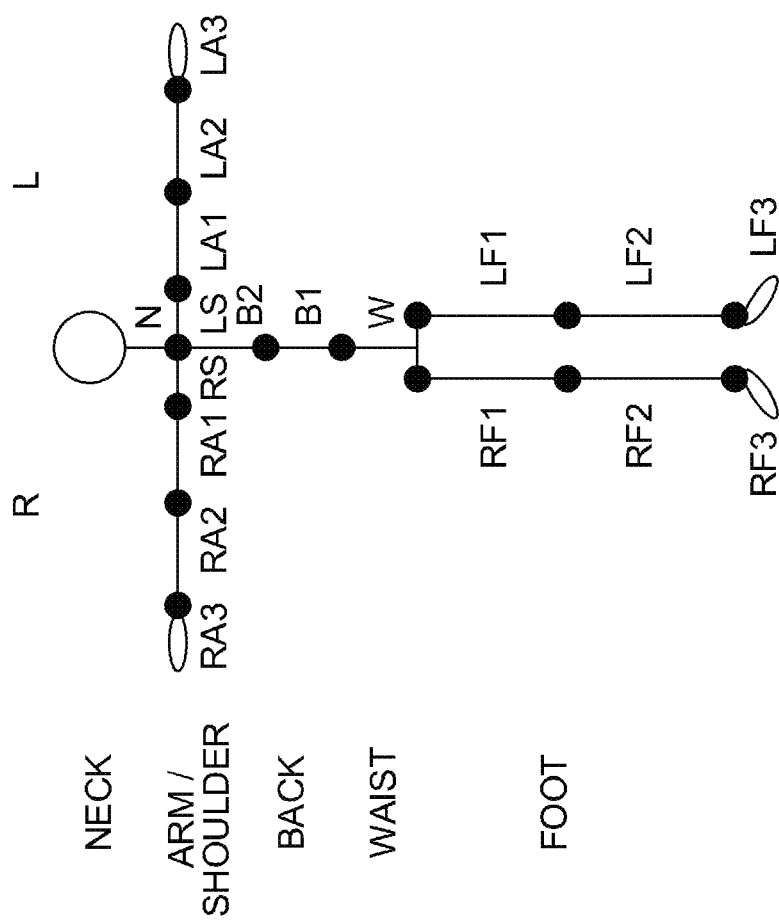

FIG. 4 are diagrams to show examples of skeleton models having a skeleton structure (articulated structure). FIG. 4A shows the components and a reference posture of a skeleton model, and FIG. 4B shows the relationships between the components of the skeleton model. Note that the examples shown in FIG. 4 are simply basic configurations, and other additional structures (for example, skin, fingers, hair, costume, hat, stick, etc.) may be provided as well.

The model shown in FIG. 4A is comprised of a plurality of skeletons, where each skeleton is comprised of two joint points and bones connecting between them. "N," "RS," and others in FIG. 4A are the names of bones, and, in this example, eighteen bones are shown.

Generally, a skeleton model is structured so that a certain joint point serves as a reference point (root), and the bones connected via each joint form a hierarchical structure. For example, the hierarchical structure of FIG. 4A can be represented as FIG. 4B. In the case of FIG. 4, the joint point between B1 and W is the root. Also, when comparing between joint points and/or bones, one that is closer to the root is called a "parent," and one that is farther from the root is called a "child."

When a CG model is placed in three-dimensional space, the model is modeled on the coordinate system for the model (local coordinate system), with reference to the location of the root. Then, the modeled CG model is mapped onto a coordinate system representing the whole three-dimensional space (the world coordinate system, the global coordinate system, etc.).

The coordinates of the components (joint points, bones, etc.) may be expressed as absolute coordinates or relative coordinates in three-dimensional space, or may be expressed as relative angles of predetermined bones with respect to a predetermined joint point. For example, when the coordinates are represented using relative angles of bones, the reference posture of the CG model may be made a posture to resemble the letter T, as shown in FIG. 4A, or the angle of each bone in the posture may be made 0°.

Note that the hierarchical structure and the position of the root are not limited to the examples of FIG. 4. For example, the location of the root may be between both feet (between RF 3 and LF 3). In addition, the coordinates and/or the angle of each component may be calculated using forward kinematics, in which calculations are made in order from the root to the end, and the coordinates and/or the angle of each component may be calculated using inverse kinematics, in which the position of a parent is inversely calculated from the position of a child, or may be calculated by using a combination of these, or by using other methods. Furthermore, in the skeleton structure, not only the above hierarchical structure, but also the initial state of the hierarchical structure, the length of each bone, the movable range of each joint and so on may be set.

<SMF Format and Choreo Data Format>

As described above, it is preferable that the choreo data format according to one aspect of the present invention conform to format for saving information of the performance of electronic musical instruments. In particular, MIDI data save format, which is widely popular, is preferable. Next, an outline of SMF (Standard MIDI File) format, which is one MIDI data save format, will be explained, and choreo data format conforming to SMF format will be explained.

SMF format is comprised of a header chunk, which contains predetermined control information, and a track chunk, which contains performance data. The performance data is comprised of combinations of delta times and MIDI events. Here, a delta time refers to the time until the next MIDI event occurs. Also, an MIDI event refers to performance content, such as, for example, "note-on" (producing sound), "note-off" (stopping sound), and so on.

A note-on signal is a signal to indicate that a specific sound is going to be produced after the corresponding delta time is over. A note-on signal can be represented as, for example, "9n kk vv" in hexadecimal, which is three bytes, and which means that "the sound of note number kk is produced with velocity vv in channel n." The channel of a note-on signal is the part in the score (the part in which a predetermined instrument is played), the note number is the pitch of the sound, and the velocity is the speed (strength) the instrument (keyboard) is hit.

A note-off signal is a signal to indicate that a specific sound is going to be silenced after the corresponding delta time is over. A note-off signal can be represented as, for example, "8n kk vv" in hexadecimal, which is three bytes, and which means that "the sound of note number kk is silenced with velocity vv in channel n."

The note number and the velocity both can assume values between 0 and 127 in decimal. Note that the note-on signal "9n kk 00" with velocity 0 carries the same meaning as that of a note-off signal that "silences the sound of note number kk in channel n."

In one example of the present invention, each channel is handled as information related to the coordinates of one component of a CG model. That is, choreo data format may be comprised of a plurality of pieces of time-series information in units of beats, related to the coordinates of a CG model's components. Here, the information related to the coordinates of components (for example, bones, joint points, etc.) may be, for example, information about the absolute coordinates or relative coordinates of components, or may be represented as relative angles of components (for example, bones).

The note number and/or the velocity of note-on signals can be used as information related to the coordinates of a CG model's components. In this case, the angle and/or the coordinates of a particular axis of a predetermined component at a given timing can be acquired from the note-on signal that is placed at the beat to match that timing. Also, the delta time of a note-on signal and/or a note-off signal may also be used as information regarding the duration of beats it takes the coordinates of a CG model's component to change.

For example, the delta time corresponding to a note-off signal may indicate the duration of beats it takes the angle (or coordinates) that is calculated from the note-on signal immediately before the instant note-off signal to transition to the angle (or coordinates) that is calculated from the note-on signal immediately after the instant note-off signal. The angle and/or coordinates of a predetermined component linked with each note may transition based on predetermined rules. For example, the speed and acceleration while transition is in progress may be determined and used based on a given interpolation method. Note that the delta time is preferably given in positive values.

The note-on/off signal is the most frequently used signal in SMF format, and allows high-speed processing in MIDI-compatible electronic instruments and/or the like.

Given a note-on signal, the coordinates or the angle may be roughly specified, from the note number, in comparatively a large unit, and the coordinates or the angle may be specified more precisely, from the velocity, in comparatively a small unit. Also, by contrast to the above, the coordinates or the angle may be roughly determined from the velocity in comparatively a large unit, and the coordinates or the angle may be specified more accurately from the note number in comparatively a small unit. Furthermore, information related to the coordinates of a CG model's components may be specified using signals other than note-on/off signals, such as system-exclusive (SysEx) events.

For example, a note-on signal may be designed so that that a predetermined angle increases by 5° every time the note number increases by one, and the predetermined angle increases by 0.05° every time the velocity increases by one. Also, the position may be defined in the same way. Note that these amounts of changes, accompanying changes in note numbers and/or others, are not limiting. Information about the associations between changes in note numbers and/or velocity, and amounts of changes in angle and/or position may be reported (configured).

Information about the coordinates of components can be classified into, for example, position information and pose information. The position information is information that indicates the relative position of a CG model with respect to its initial position (for example, the position at the beginning of a CG movie), and may be represented by, for example, the x-axis coordinate, the y-axis coordinate and the z-axis coordinate of the reference point (root) of the CG model, and the rotation angle of the reference point. Furthermore, the pose information is information that indicates the angle or the position with respect to the reference posture of the CG model, and, for example, assuming that the posture of the letter T shown in FIG. 4A is 0°, a number of specific bones may be represented by the x-axis relative angle, the y-axis relative angle and the z-axis relative angle between parent bones and child bones.

To which channel information related to the coordinates of each component (for example, bone) is assigned can be selected appropriately based on in what mode the system is run, and so on. One piece of information related to a component's coordinates may be assigned per channel, or a plurality of pieces of information may be assigned likewise. For example, a configuration may be adopted here in which the x-axis relative angle, the y-axis relative angle and the z-axis relative angle of a predetermined bone are all included in one channel.

Also, the SMF format to which choreo data format conforms is not particularly limited. For example, it is possible to use format 0, in which information of all channels is contained in one track, use format 1, which is comprised of multiple tracks, or use format 2. In addition, new formats other than existing formats 0 to 2 may be used. Furthermore, choreo data format is by no means limited to SMF format as long as it carries information for designating the coordinates of a CG model's components, in chronological order, in units of beats.

As described above, the choreo data format according to one embodiment of the present invention is compatible with, for example, SMF format, and includes time-series information (repetitions of note-on/off signals) for specifying the coordinates of a CG model's components in chronological order, in units of beats, for each channel in MIDI. By allowing the data structure to have SMF format, it becomes easy to link the movement of a CG model with other pieces of equipment or systems such as electronic musical instruments.

As for choreo data, data that carries pose information, which corresponds to three specific angles of a predetermined number of designated bones, and position information, which is comprised of four axes, for every frame cycle corresponding to a predetermined duration of beats, is preferable. This predetermined frame cycle can be specified based on a predetermined tempo (for example, BPM).

For example, the predetermined frame cycle may be a cycle to match the duration of a given beat at a predetermined tempo (for example, the duration of one beat, the duration of a ⅛ beat, etc.). Furthermore, this predetermined frame cycle can be calculated by multiplying the duration of beats by the number of frames per unit time (for example, FPS (Frames Per Second)). Note that the time-series information to be included as choreo data does not necessarily have to be provided in sets of ⅛ beats, and may be provided in greater units or in smaller units, taking into account the tradeoff between the amount of data and the reproducibility of original motion data.

Hereinafter, the components of a CG model included in motion data will be simply referred to as "components of motion data (choreo data)," based on the assumption that motion data conforms to choreo data format.

(Merging Based on Merging Parameters)

According to one embodiment of the present invention, the device (for example, a user terminal 10) shown in FIG. 2 merges ("blends," "synthesizes," etc.) a plurality of pieces of motion data based on a predetermined merging parameter to generate new motion data. In this way, by changing (controlling) the value of a merging parameter over time, it is possible to shift certain motion data to different motion data dynamically and naturally.

According to the herein-proposed merging method, information about the coordinates of the components (for example, bones, joint points, etc.) of each motion data is merged based on a merging parameter. The merging parameter is a parameter that is associated with motion data, and, for example, BPM. The method of obtaining the merging parameter will be described later. Note that, basically, information about the coordinates of all components is merged, but it is also possible to adopt a configuration by which only information related to the coordinates of some components is merged.

As specific examples of the merging method, interpolation or extrapolation using linear interpolation, spline interpolation and so on may be used, or other methods may be used. Note that "merging" as used in the present specification means selecting or generating (synthesizing) at least one piece of data out of a plurality of pieces of data, provided that there are cases where the data selected based on a merging parameter is used on an as-is basis.

For example, in the event motion data 1 of BPM=x and motion data 2 of BPM=y are merged to generate motion data 3 of BPM=z, what weights are assigned to the coordinates of the components of motion data 1 and motion data 2 is decided based on x, y and z, and the coordinates of the components of motion data 3 are calculated.

More generally, when there are a plurality of pieces of data, data (specific data) that corresponds to a case where the merging parameter assumes a specific value is generated, by using data that is generated so that, in the first data corresponding to the case where the merging parameter (for example, BPM) has the first value, the first value matches a specific value (for example, the target BPM), and data that is generated so that, in second data that corresponds to the case where the merging parameter has a second value, a second value matches the above specific value.

Figure 5:
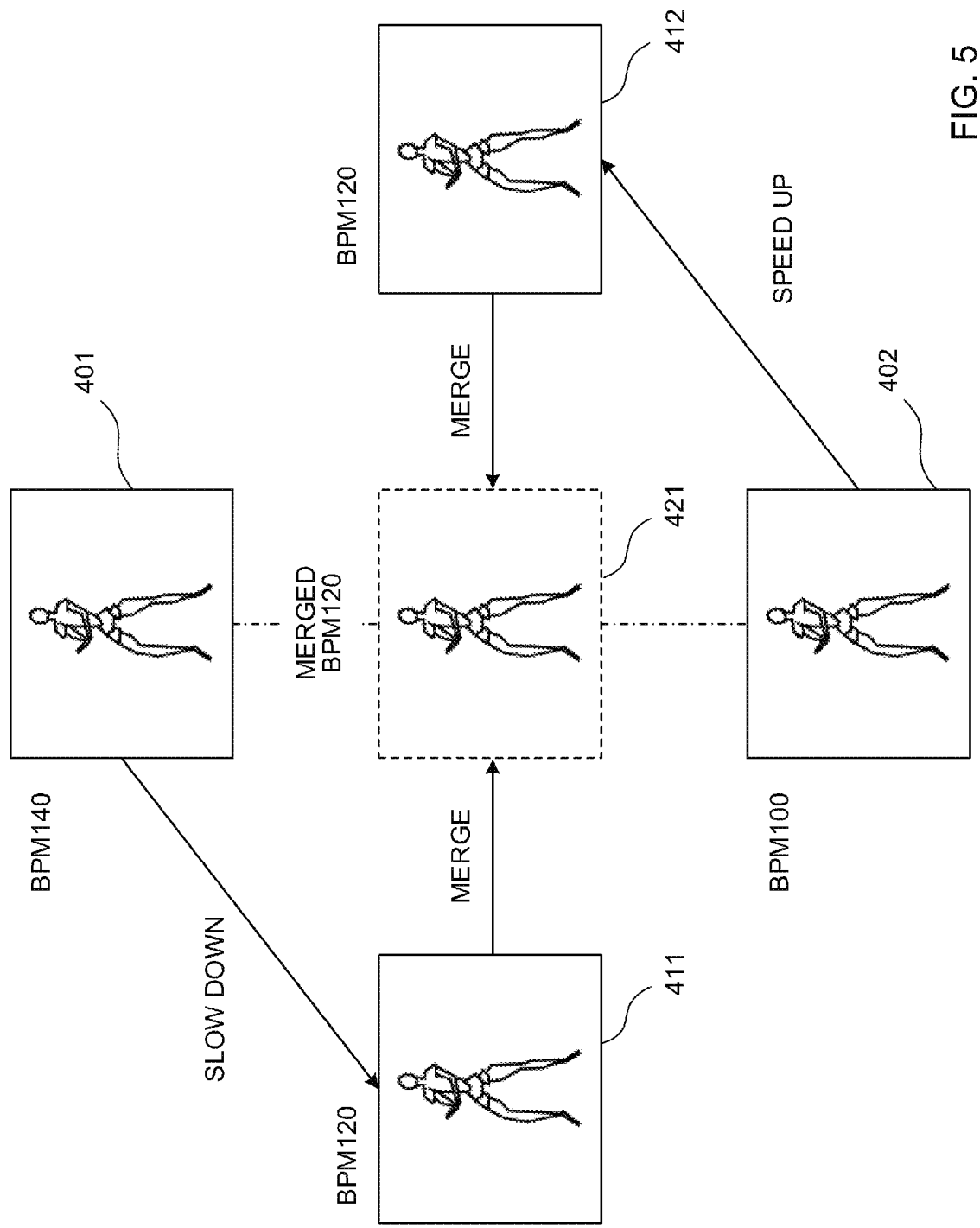
FIG. 5 is a diagram to show an example of merging a plurality of pieces of motion data of varying BPMs according to the herein-proposed merging method.

FIG. 5 is a diagram to show an example of merging a plurality of pieces of motion data of varying BPMs according to the herein-proposed merging method. Motion data 401 and motion data 402 are both base data, corresponding to (associated with) BPM=140 and BPM=100, respectively.

When motion with a BPM (target BPM) between BPM=100 and BPM=140 is to be generated, for example, each base data is played at the target BPM, and the resulting motions are merged into one to generate a new motion, rather than changing the BPM of one base data.

In the case of FIG. 5 where the target BPM is 120, motion data 411 (BPM=120), in which the motion data 401 (BPM=140) is delayed, and motion data 412 (BPM=120), in which the motion data 402 (BPM=100) is accelerated, are merged into one, and motion data 421 (BPM=120) is generated.

Note that, although it is preferable to produce different motions from a plurality of pieces of base data, respectively, it is preferable to adopt a configuration in which, at the same timing (the same beat), at least some of the components assume the same coordinates (or close coordinates). For example, in FIG. 5, the motion data 401 is data to represent a certain dance motion, and the motion data 402 is data to represent a motion that is given by increasing the amount of movement in the motion data 401. In particular, each motion data may be configured so that the timing (beat) at which the leg touches the ground, the timing at which the motion stops, and so on match, so that it is possible to prevent unnatural (awkward) motion from being generated when these pieces of data are merged.

Here, although BPM has been used as the merging parameter in the above example, this is by no means limiting. For example, parameters to indicate the characteristics of motion may be used as merging parameters. As parameters to represent the characteristics of motion, a parameter to indicate the magnitude (strength) of motion, a parameter to indicate the vibes of motion (rhythm, groove, etc.), a parameter to indicate the quality of motion (for example, manly motion, feminine motion, etc.), and/or other parameters can be used. Here, the parameter to indicate the magnitude of motion may be referred to as "tension (excitement)."

Also, as merging parameters, multiple kinds of parameters (merging parameter set) may be used. In this case, for example, merging can be executed by using data corresponding to each set of values of merging parameters included in the merging parameter set. This will be described later.

(Data to Merge)

Although the herein-proposed merging method merges a plurality of pieces of data, these multiple pieces of data (merging target) may include, for example, following (1), (2) and (3), or a combination of these:

(1) information about the coordinates of a plurality of components of choreo data (motion data), (2) information about the coordinates of components included in each of a plurality of channels in one piece of choreo data, (3) information about the coordinates of a plurality of components included in one channel in one piece of choreo data. Note that the herein-proposed merging method can also be applied to a plurality of pieces of data in format other than choreo data format.

In the case of (1) or (2) above, merging is carried out with respect to the coordinates of a plurality of components sampled from each choreo data and each channel, by using merging parameters as described above. Now, an example of above (3) will be described below with reference to FIG. 6.

Figure 6:
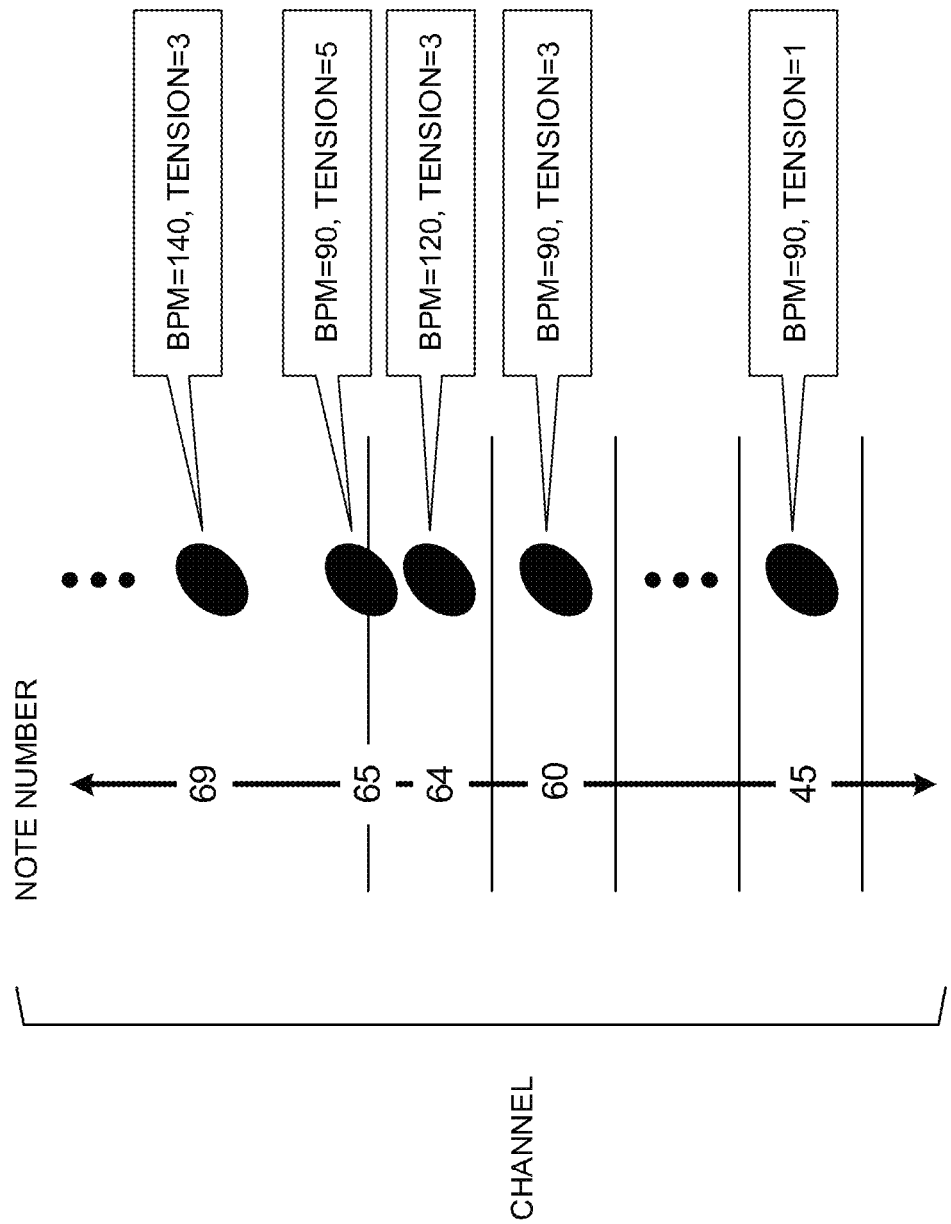
FIG. 6 is a diagram to show examples of note-on signals included in one channel when BPM and tension are used as merging parameters.

FIG. 6 is a diagram to show an example of a note-on signal included in one channel when BPM and tension are used as merging parameters. In this example, a number of pieces of choreo data, corresponding to BPMs=90, 120 and 140 and tensions=1, 3 and 5, respectively, are partly shown. In this case, one channel can be configured to include a total of nine note-on signals, comprised of three patterns of BPMs×three patterns of tensions.

Thus, by using both BPM and tension as merging parameters (merging parameter set), more flexible control of motion is possible. Note that the merging parameter set is not limited to the combination of BPM and tension, and it is also possible to combine and use arbitrary merging parameters. Also, the configuration to use a plurality of parameters as merging parameters is by no means limited to the above case of (3), and can be used even in the case of (1) and (2) above as well.

The device to reproduce choreo data determines the data to be reproduced, per channel, at each timing, based on, for example, the tempo (BPM) and tension supplied from the outside. In FIG. 6, when BPM=90 and tension=3 are commanded, the playback device identifies the data of this channel as a note-on signal of note number 60, and plays the data.

Note that the association between a predetermined signal (for example, a note-on signal) and a predetermined merging parameter may be represented by a signal defined in SMF format (for example, a note-off signal (a note-off signal corresponding to the above note-on signal (with the same note number)), another event (an MIDI event (for example, a pitch bend), a SysEx event, and/or the like), and/or other signals).

A signal like this that associates between a signal (data) and a merging parameter may be referred to as "extra code," for example. For example, in the choreo data, information specifying the corresponding BPM and tension can be associated with each note-on signal using an extra code. Also, these associations can be used in addition to the case of (3) above.

Also, when communicating choreo data based on OSC protocol, a note-on signal can be converted into an OSC message, and information for specifying the corresponding BPM and tension can be put and transmitted in the argument of the OSC message.

In this way, by placing merging parameters in extra code or in OSC messages, it becomes possible to control the merging method in a dynamic manner.

Figure 7:
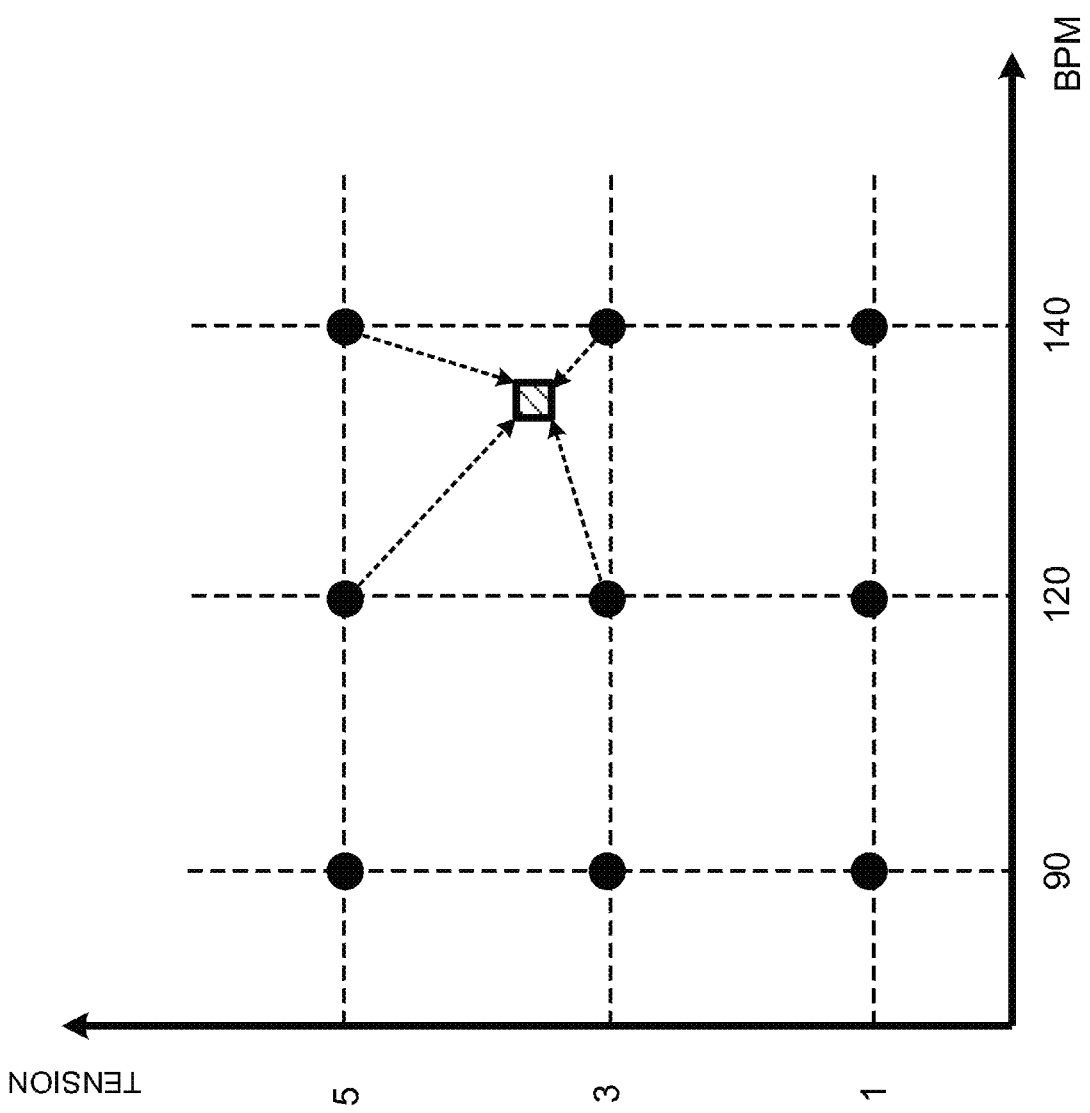
FIG. 7 is a diagram to show an example of interpolation.

Note that, if there is no data that corresponds to an acquired merging parameter on a one-by-one basis, data that corresponds to the merging parameter (also referred to as the "stipulated (configured) merging parameter") corresponding to the base data may be interpolated. FIG. 7 is a diagram to show an example of interpolation. In this example, as in FIG. 6, three patterns of BPMs and tensions are stipulated.

As shown in the drawing, for example, if merging parameters (BPM, tension) with values=(135, 3.5) are acquired, data may be reproduced by merging the data that corresponds to a set of four merging parameters that are stipulated nearby. Note that data can be generated using extrapolation or scaling, even when merging parameters are acquired from outside the stipulated range of merging parameters.

FIG. 8 is a diagram to show an example of motion data and corresponding choreo data over time. In this example, BPM is used as a merging parameter, and motions corresponding to three BPMs are stipulated for one channel of choreo data. This example illustrates a series of motions in which a person bends, jumps and lands. When the playback BPM changes during the motion, merging is performed based on these three pieces of data.

FIG. 8 shows, as an example, the coordinates (relative angle θ) of a predetermined component of each base data are shown. Note that, as shown in FIG. 8, the relationships of values (coordinates) corresponding to each parameter in terms of magnitude does not have to be always fixed, and may change at predetermined time intervals.

Furthermore, in choreo data, the merging parameters that are stipulated (BPMs=90, 120 and 140 in the drawing) may be the same all the time, or may be configured to vary (for example, the number of parameters, the values of parameters, and/or others may vary) at predetermined time intervals (for example, every predetermined number of beats). That is, the configuration (at least one of the number of data and the corresponding parameter values) of data that can be used for merging may vary over time. By applying different configurations at certain time intervals, it is possible to provide time periods, in choreo data, where the merging parameter varies and the motion changes significantly, so that it is possible to express motion more flexibly.

Also, a configuration may be adopted here in which, in choreo data, a merging parameter set is not configured (not used) for a predetermined period (first period). In this case, in this period, motion is reproduced based on one piece of motion data, regardless of the value of BPM, tension and so on. Note that, this configuration may be configured so that, in another period (second period), the merging parameter is configured, and motion is reproduced using the herein-proposed merging method.

When a plurality of merging parameters are stipulated, the configuration of one parameter (for example, tension) may be fixed and the configuration of other parameters (for example, BPM) may be changed every time, or they may be configured fixed or the same.

(Coping with Sudden Variation of Merging Parameter)

According to the above-proposed merging method, when the merging parameter changes suddenly, the motion will also change abruptly before and after the change, but such behavior is undesirable in some cases. The present inventors have focused on the fact that, for example, when a person is dancing to music and the BPM of the music changes suddenly, he/she will keep dancing for a while according to the BPM before the variation, while gradually adjusting to the BPM after the change.

Therefore, the present inventors have come up with the idea of delaying changes of motion in response to sudden changes of BPM. In the following, the merging method for use when BPM changes suddenly will be explained, the same method can be applied even when merging parameters other than BPM vary abruptly. Here, when "a merging parameter changes suddenly," this means that the value of the parameter changes by a predetermined threshold or more (or larger) in a given period (for example, during the period of one beat).

FIG. 9 is a diagram to show an example of the herein-proposed merging method, in the event BPM changes suddenly. In this example, two pieces of base data (BPMs=100 and 140) are provided, and the tempo changes sharply from BPM=100 to BPM=140 at the timing of a predetermined beat. For example, the coordinate (relative angle θ) of a given component of each base data is shown here.

FIG. 9A is a diagram to show transition of motion where no special countermeasures are taken against a sudden change of BPM. In this case, the motion suddenly changes at the timing BPM=100 switches to BPM=140.

FIG. 9B is a diagram to show transition of motion where a sudden change of motion is suppressed in response to a sudden change of BPM. In the example of FIG. 9B, the period of a predetermined number of beats (four beats here) from the timing of switching from BPM=100 to BPM=140 is the transition period, so that, after the predetermined number of beats are over, the motion can be reproduced reliably at BPM=140.

Here, as for the method of motion transition during the transition period, for example, the above-described proposed merging method may be designed so that the motion of BPM=100 gradually changes (shifts) to the motion of BPM=140 over the transition period. For example, the merging process may be carried out to make a shift at an even pace over time so that a motion to correspond to BPM=110 will follow one beat after the above switching timing, a motion corresponding to BPM=120 will follow two beats after that, and a motion corresponding to BPM=130 will follow three beats after that, or a shift may be made by assigning weights on a per beat basis.

Also, the length of the transition period may be controlled to increase or decrease in accordance with the amount of change of the merging parameter. For example, when the amount of change is large, the transition period may be lengthened.

Note that at least one of information about the duration of the above transition period, information about the amount of change (threshold for the amount of variation) to judge that a predetermined merging parameter has varied suddenly, and information as to whether or not to enable the function for coping with sudden variation of a predetermined merging parameter may be included in note-on/off signals in choreo data, other events (MIDI events, SysEx events, and/or other events), OSC messages, other signals and so on. For these pieces of information, different contents (values) may be reported per merging parameter. In addition, some or all of these pieces of information may be held in the device in advance.

For example, a device in which the threshold for the amount of change of BPM as the merging parameter is configured (reported) to be a predetermined value (for example, 40) compares the current BPM (third value) with a newly designated BPM (fourth value), and, if the amount of variation (the difference or the absolute value of the difference) of BPM is smaller (or less) than 40, executes the herein-proposed merging method based on the newly designated BPM, while, if the amount of variation is 40 or more (or greater), the device may exert control so that, in a transition period of a predetermined number of beats, the motion corresponding to the current BPM will gradually shift to the motion corresponding to the newly designated BPM.

In other words, when the value of the merging parameter changes from a third value to a fourth value and the absolute value of the difference between the third value and the fourth value is greater than or equal to a predetermined threshold, the merging device can perform the process of merging the motion data corresponding to the third value and the data corresponding to the fourth value based on the assumption that the value of the merging parameter is between the third value and the fourth value, in a transition period that starts from the timing the value of the merging parameter varies.

As described above, the device that executes the herein-proposed merging method can control the merging method (motion transition method) in the event the merging parameter varies based on the above-noted information. Note that, although a case has been described with the above example where BPM changes suddenly, this is by no means limiting. Even if another merging parameter (for example, tension) changes suddenly, the same control can be executed.

(Method for Controlling Merging Parameter)

The device to execute the herein-proposed merging method may detect (judge) the merging parameter from another piece of data (for example, music data) that is played in synchronization with motion data. In this case, the device can execute the herein-proposed merging method based on the BPM at which the music data is played.

Also, the device to implement the herein-proposed merging method may generate merging parameters inside the subject device, or merging parameter may be reported from the outside, may be held in advance, and so on. Now, referring to FIG. 10 and FIG. 11, an example of a control device for controlling (generating, reporting, etc.) merging parameters will be described below.

Figure 10:
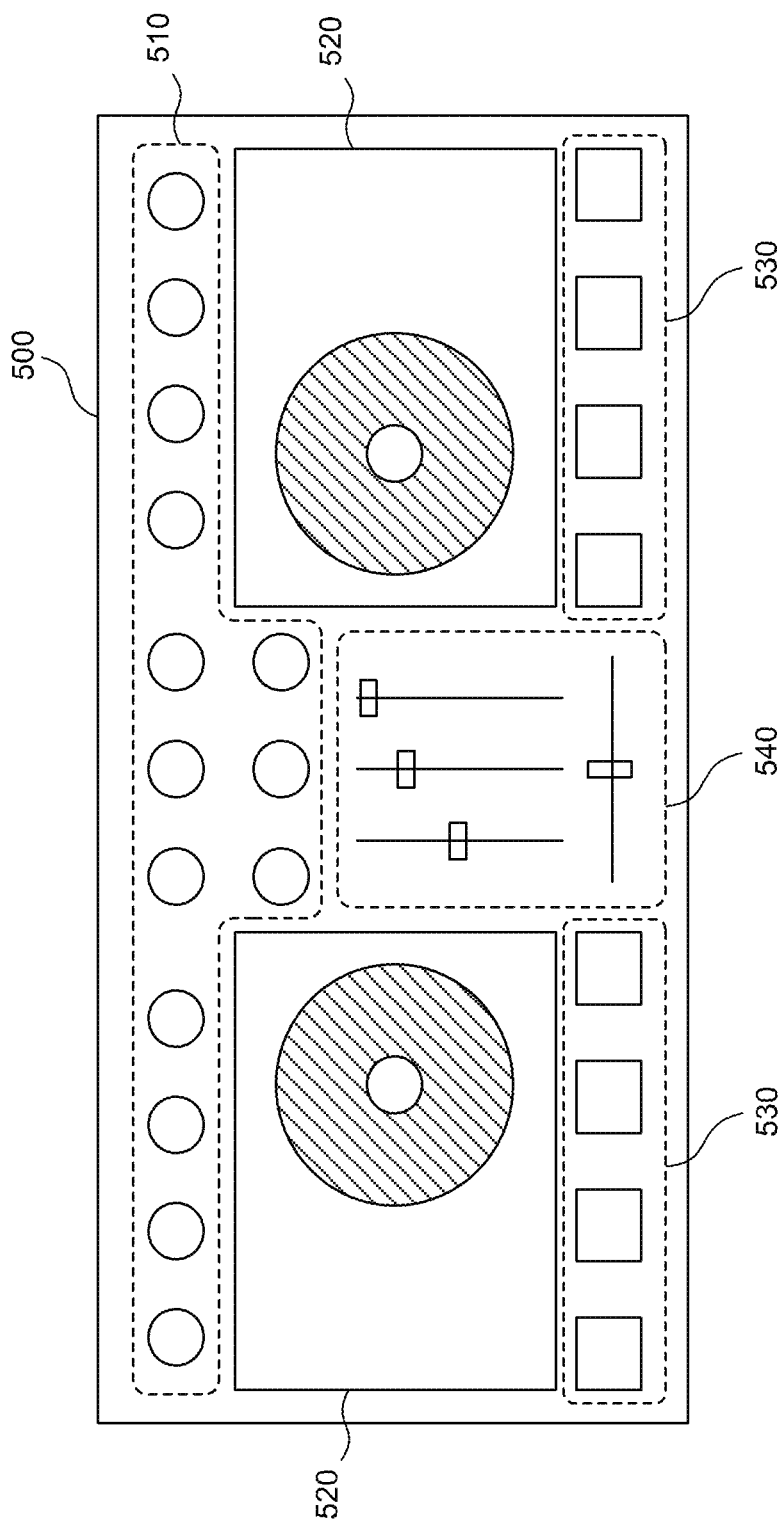
FIG. 10 is a diagram to show an overall view of a control device that controls merging parameters.
Figure 11:
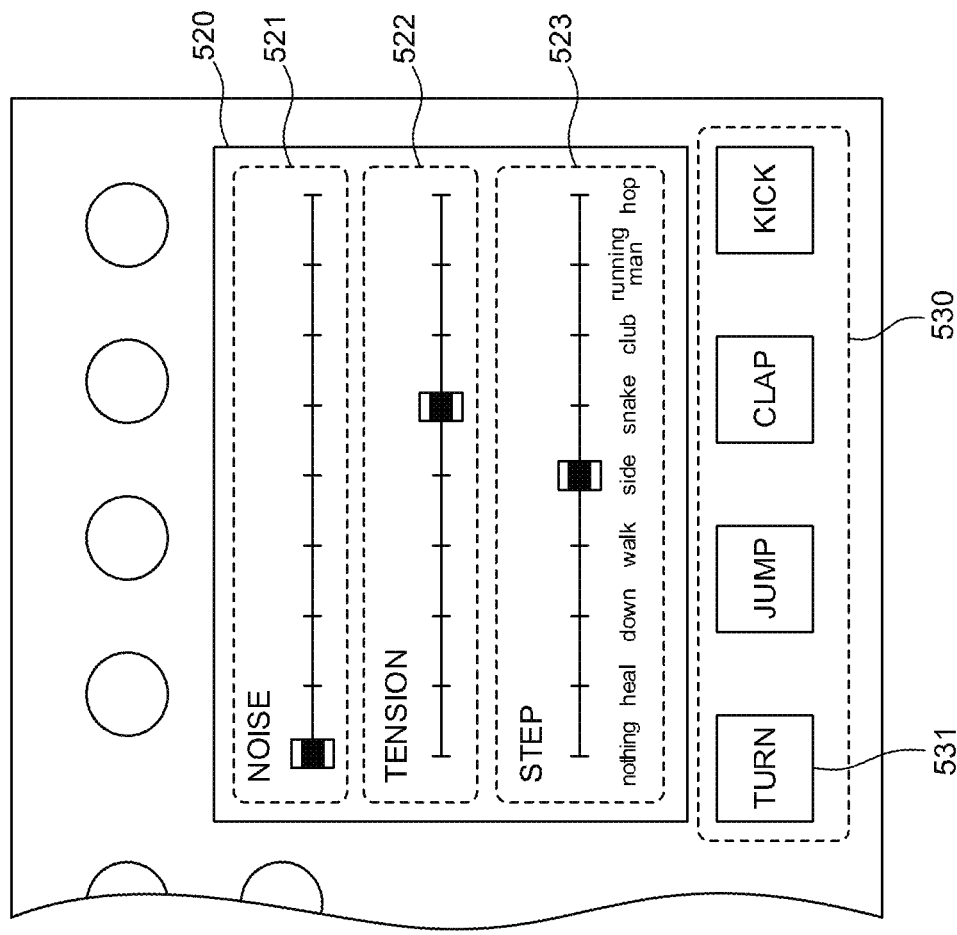
FIG. 11 shows an enlarged view of a part of the control device of FIG. 10.

FIG. 10 shows an overall view of a control device for controlling merging parameters FIG. 11 shows an enlarged view of a part of the control device of FIG. 10. Here, an example case will be described below, in which a control device 500 is included in the information processing system 1 shown in FIG. 2, the merging parameter is reported to another device (user terminal 10) via a network 40, and motion data of a 3D model is played by the other device. Note that the control device 500 may be any of the user terminal 10, the server 20, and the electronic musical instrument 30 of FIG. 2.

The control device 500 includes, for example, a knob section 510, which includes one or more knobs, a display section 520, which includes one or more displays, a button section 530, which includes one or more buttons, a slider section 540, which includes one or more sliders, and so on. FIG. 10 and FIG. 11 illustrate the appearance of the control device 500, assuming that the control device 500 has a configuration for realizing functions that are necessary for various kinds of information processing and communication processes.

The knobs accept operations by the user, such as push, rotation, push and turn, and so on. The buttons accept pressing operations by the user. The sliders accept slide operations by the user. Based on these operations, predetermined signals are input to the control device 500, so that the process in the control device 500 can be changed.

A display is an output device that outputs electrical signals of images. When a display is formed with a touch panel, it is possible to accept operations by the user. FIG. 10 shows an example in which a turn table for enjoying DJ (Disc Jockey) play is displayed on displays, but this is by no means limiting. For example, a configuration that can change the contents to be displayed on the displays by operating the knob section 510 and so on may be adopted.

Not only the merging parameters, but also the control signals of choreo data played in the user terminal 10, may be transmitted by the control device 500. In FIG. 11, the display section 520 displays a noise section 521 for controlling the noise (distortion) to add to motion, a tension section 522 for controlling tension, which is one merging parameter, and a step section 523 for controlling motion (base data).

Note that, when noise is added to a certain motion, at least part of the coordinates of the components of the motion data changes (for example, changes in the x-axis direction), compared to the case where there is no noise. Note that the direction of change and the amount of change may differ per component.

The noise section 521 displays noise (for example, the magnitude of noise). In FIG. 11, the user can change noise by operating the sliders displayed on the display. The control device 500 can generate information related to the noise displayed on the noise section 521.

The tension section 522 displays the tension. In FIG. 11, the user can change tension by operating the sliders displayed on the display. The control device 500 can generate information related to the tension displayed on the tension section 522.

The step section 523 displays the step. Here, the step refers to the basic motion that is defined with relatively a large number of beats, such as a set of eight beats (one eight), a set of thirty-two beats comprised of eight beats× four (four eights) and so on, and may be referred to as the "basic move," the "move," and/or the like. The motion data of the step may be configured to define the motion of the whole body, not the upper body or the lower body alone.

In FIG. 11, the user can change the step by operating the sliders displayed on the display. The control device 500 can generate information related to the step displayed in the step section 523.

Note that the noise, tension, step and so on may be changed by operating other sections than the display section 520, such as the knob section 510 shown in FIG. 10.

The buttons 531 of the button section 530 may be each associated with a motion (which may be referred to as an "accent motion," "accent," etc.) that is defined by a smaller number of beats than a step. FIG. 11 shows buttons corresponding to the motion data of "turn," "jump," "clap," and "kick," respectively, and, when the user operates one of these buttons, the control device 500 can generate information that specifies the motion corresponding to the button.

Based on the information, the user terminal 10 can at least partly overwrite (or synthesize) the information related to the coordinates of the components of the step. For example, when the user operates the "clap" button 531 while the step is "side," the user terminal 10 can reproduce a motion, in which a 3D model performs the action of clapping while making a side step.

The control device 500 may transmit various pieces of information that are generated, to the user terminal 10. Also, the control device 500 may select choreo data based on various pieces of information that are generated, or merge choreo data based on the herein-proposed merging method, so that the selected or merged choreo data is transmitted to the user terminal 10. In addition, the control device 500 may perform control so that the selected or merged choreo data is displayed in the display section 520.

By using the control device 500 described above, it is possible to change the merging parameter manually on a real-time basis, so that 3D models can be reproduced interactively, based on motion data.

Various kinds of information such as described above may be included and transmitted in note-on/off signals in choreo data, other events (MIDI events, SysEx events, etc.), OSC messages, other signals, and so on.

Also, the terminology used in this description and the terminology that is needed to understand this description may be replaced by other terms that convey the same or similar meanings. Also, the information and parameters described in this specification may be represented in absolute values or in relative values with respect to predetermined values, or may be represented in other information formats.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

The aspects/embodiments illustrated in this specification may be used individually or in combinations, which may be switched depending on the mode of implementation. Also, predetermined information (for example, information to the effect that "X holds") does not necessarily have to be reported explicitly, and can be reported in an implicit manner (by, for example, not reporting this piece of information). Furthermore, reporting of information is by no means limited to the aspects/embodiments described in this specification, and other methods may be used as well.

The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

The disclosure of Japanese Patent Application No. 2016-044890, filed on Mar. 8, 2016, including the specification, drawings and abstract, is incorporated herein by reference in its entirety.

The invention claimed is:

1. A device comprising:
a processor that generates specific data, which corresponds to a case where a predetermined parameter has a specific value, using a plurality of pieces of data corresponding to respective cases where the predetermined parameter has different values; and
wherein the processor reproduces a predetermined computer graphics (CG) model based on the specific data,
wherein the predetermined parameter is at least one from among a tempo (Beats Per Minute (BPM)) with which a motion of the predetermined CG model is indicated and a parameter that indicates a characteristic of motion of the predetermined CG model, and
wherein the plurality of pieces of data are motion data of the predetermined CG model, and include time series information that designates the coordinates of components of the predetermined CG model in chronological order in units of beats.

2. The device according to claim 1, wherein the processor generates the specific data, using, among the plurality of pieces of data, data that is generated so that, in first data, which corresponds to a case the predetermined parameter has a first value, the first value matches the specific value, and data that is generated so that, in second data, which corresponds to a case the predetermined parameter has a second value, the second value matches the specific value.

3. The device according to claim 1, wherein the plurality of pieces of data are included in channels of the same data structure conforming to SMF (standard MIDI File) format.

4. The device according to claim 1, wherein the predetermined parameter is included in a signal defined in SMF (Standard MIDI File) format or in an OSC (Open Sound Control) message.

5. The device according to claim 1, wherein at least one from among the number of the plurality of pieces of data and the value of the predetermined parameter corresponding to each data varies over time.

6. The device according to claim 1, wherein, when the specific value varies from a third value to a fourth value, and an absolute value of the difference between the third value and the fourth value is greater than or equal to a predetermined threshold, the processor generates the specific data, in a predetermined period from the timing the specific value varies, based on the assumption that the specific value is between the third value and the fourth value, and
wherein the specific data for the specific value of the third value gradually changes to the specific data for the specific value of the fourth value for over the predetermined period.

7. The device according to claim 1, wherein the predetermined parameter is at least one from among a parameter to indicate a magnitude of motion, a parameter to indicate vibes of motion, and a parameter to indicate a quality of motion that includes at least one from among manly motion and feminine motion.

8. The device according to claim 1, wherein the plurality of pieces of data are dance motion data, and
wherein the plurality of pieces of data of at least one from among the components of the predetermined CG model are a same coordinate at a timing at which a leg touches a ground or a timing at which the motion stops.

9. The device according to claim 1, wherein the plurality of pieces of data includes a position information of the predetermined CG model for a predetermined frame cycle,
wherein the predetermined frame cycle is calculated by multiplying a duration of beats by a number of frames per unit time.

10. A non-transitory computer readable storage medium having stored thereon instructions comprising executable code, which when executed by a processor, cause the processor to:
generate specific data, which corresponds to a case where a predetermined parameter has a specific value, using a plurality of pieces of data corresponding to respective cases where the predetermined parameter has different values; and
reproduce a predetermined computer graphics (CG) model based on the specific data,
wherein the predetermined parameter is at least one from among a tempo (Beats Per Minute (BPM)) with which a motion of the predetermined CG model is indicated and a parameter that indicates a characteristic of motion of the predetermined CG model, and
wherein the plurality of pieces of data are motion data of the predetermined CG model, and include time series information that designates the coordinates of components of the predetermined CG model in chronological order in units of beats.

11. The storage medium according to claim 10, wherein, in the control step, the specific data is generated, using, among the plurality of pieces of data, data that is generated so that, in first data, which corresponds to a case the predetermined parameter has a first value, the first value matches the specific value, and data that is generated so that, in second data, which corresponds to a case the predetermined parameter has a second value, the second value matches the specific value.

12. The storage medium according to claim 10, wherein the plurality of pieces of data are included in channels of the same data structure conforming to SMF (standard MIDI File) format.

13. The storage medium according to claim 10, wherein the predetermined parameter is at least one from among a parameter to indicate a magnitude of motion, a parameter to indicate vibes of motion, and a parameter to indicate a quality of motion that includes at least one from among manly motion and feminine motion.

14. The storage medium according to claim 10, wherein the plurality of pieces of data are dance motion data, and wherein the plurality of pieces of data of at least one from among the components of the predetermined CG model are a same coordinate at a timing at which a leg touches a ground or a timing at which the motion stops.

15. The storage medium according to claim 10, wherein the plurality of pieces of data includes a position information of the predetermined CG model for a predetermined frame cycle,
wherein the predetermined frame cycle is calculated by multiplying a duration of beats by a number of frames per unit time.

16. An information processing method, comprising the steps of:
generating specific data, which corresponds to a case where a predetermined parameter has a specific value, using a plurality of pieces of data corresponding to respective cases where the predetermined parameter has different values; and
reproducing a predetermined computer graphics (CG) model based on the specific data,
wherein the predetermined parameter is at least one from among a tempo (Beats Per Minute (BPM)) with which a motion of the predetermined CG model is indicated and a parameter that indicates a characteristic of motion of the predetermined CG model, and
wherein the plurality of pieces of data are motion data of the predetermined CG model, and include time series information that designates the coordinates of components of the predetermined CG model in chronological order in units of beats.

17. The method according to claim 16, wherein the predetermined parameter is at least one from among a parameter to indicate a magnitude of motion, a parameter to indicate vibes of motion, and a parameter to indicate a quality of motion that includes at least one from among manly motion and feminine motion.

18. The method according to claim 16, wherein the plurality of pieces of data are dance motion data, and
wherein the plurality of pieces of data of at least one from among the components of the predetermined CG model are a same coordinate at a timing at which a leg touches a ground or a timing at which the motion stops.

19. The method according to claim 16, wherein the plurality of pieces of data includes a position information of the predetermined CG model for a predetermined frame cycle,
wherein the predetermined frame cycle is calculated by multiplying a duration of beats by a number of frames per unit time.

* * * * *